(12) United States Patent
Chang et al.

(10) Patent No.: US 8,014,655 B2
(45) Date of Patent: Sep. 6, 2011

(54) CAMERA MODULE

(75) Inventors: Chia-Chun Chang, Taipei Hsien (TW); Shih-Chieh Yen, Taipei Hsien (TW); Hung-Lung Ho, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/825,343

(22) Filed: Jun. 29, 2010

(65) Prior Publication Data

US 2011/0150459 A1  Jun. 23, 2011

(30) Foreign Application Priority Data

Dec. 18, 2009 (CN) ............... 2009 1 0311750

(51) Int. Cl.
*G03B 17/00* (2006.01)
*G02B 7/02* (2006.01)

(52) U.S. Cl. ............................ 396/5; 359/819
(58) Field of Classification Search ............... 396/529; 359/819

See application file for complete search history.

(56) References Cited

U.S. PATENT DOCUMENTS

| | | | | |
|---|---|---|---|---|
| 5,798,876 A * | 8/1998 | Nagano | ............ | 359/819 |
| 7,224,542 B2 * | 5/2007 | Kuchimaru | ............ | 359/811 |
| 7,362,519 B2 * | 4/2008 | Sakaki | ............ | 359/811 |
| 7,417,807 B2 * | 8/2008 | Chiang | ............ | 359/811 |
| 7,609,466 B2 * | 10/2009 | Yen | ............ | 359/819 |
| 2004/0042088 A1 * | 3/2004 | Ito | ............ | 359/819 |
| 2006/0140623 A1 * | 6/2006 | Yu | ............ | 396/529 |
| 2009/0052063 A1 * | 2/2009 | Yu | ............ | 359/793 |
| 2009/0174954 A1 * | 7/2009 | Hara | ............ | 359/819 |
| 2009/0190241 A1 * | 7/2009 | Yen | ............ | 359/819 |
| 2009/0244735 A1 * | 10/2009 | Sasaki | ............ | 359/830 |
| 2009/0244736 A1 * | 10/2009 | Sasaki | ............ | 359/830 |
| 2009/0290239 A1 * | 11/2009 | Wu | ............ | 359/819 |
| 2011/0026144 A1 * | 2/2011 | Shyu et al. | ............ | 359/819 |
| 2011/0058265 A1 * | 3/2011 | Chang et al. | ............ | 359/793 |
| 2011/0063739 A1 * | 3/2011 | Hirata et al. | ............ | 359/819 |
| 2011/0069198 A1 * | 3/2011 | Ezawa et al. | ............ | 348/222.1 |

* cited by examiner

*Primary Examiner* — Rodney Fuller
(74) *Attorney, Agent, or Firm* — Altis Law Group, Inc.

(57) ABSTRACT

A camera module includes a lens barrel, a first lens and a second lens. The lens barrel includes a substantially cylindrical inner wall. The first lens is received in the lens barrel. The first lens includes a first circumferential side surface spaced from the inner wall. The second lens is engaged with the first lens and received in the lens barrel. The second lens includes a second circumferential side surface. The second circumferential side surface has a first portion contacting the inner wall and a second portion spaced from the inner wall, thus a gap defined between the second portion and the inner wall. Adhesive is applied in the gap between the second portion and the inner wall.

14 Claims, 3 Drawing Sheets

CAMERA MODULE

BACKGROUND

1. Technical Field

The present disclosure relates to image capture, and more particularly to a camera module for a portable electronic device.

2. Description of Related Art

Camera modules are often provided in mobile telephones, personal digital assistants or other devices, allowing convenient and practical image capture capability.

A commonly used camera module includes a cylindrical lens barrel, and a first lens, a spacer and a second lens received in the lens barrel. The lens barrel includes a flange extending inward from one end thereof and defines an opening at the other end away from the flange. When assembled, the first lens and the spacer are disposed into the lens barrel in sequence via the opening with the first lens contacting the flange. The spacer has a first side contacting the first lens and a second side facing the opening. UV-cure adhesive is disposed on a periphery of the second side of the spacer. The second lens is placed into the lens barrel contacting the second side of the spacer. Finally, the UV-cure adhesive is exposed to ultraviolet radiation and cured thereby. A portion of the molten UV-cure adhesive flows into the clearance between the second lens and the lens barrel, fixing the second lens to the lens barrel.

In the camera module described, excessive UV-cure adhesive may be disposed on the spacer, which, when molten, may flow to a central portion of the second lens, covering the lens. In addition, the molten UV-cure adhesive may misalign the second lens with respect to an optical axis of the first lens, decreasing the quality of images captured by the camera module.

It is thus desirable to provide a camera module which can overcome the described limitations.

DETAILED DESCRIPTION

Figure 1:
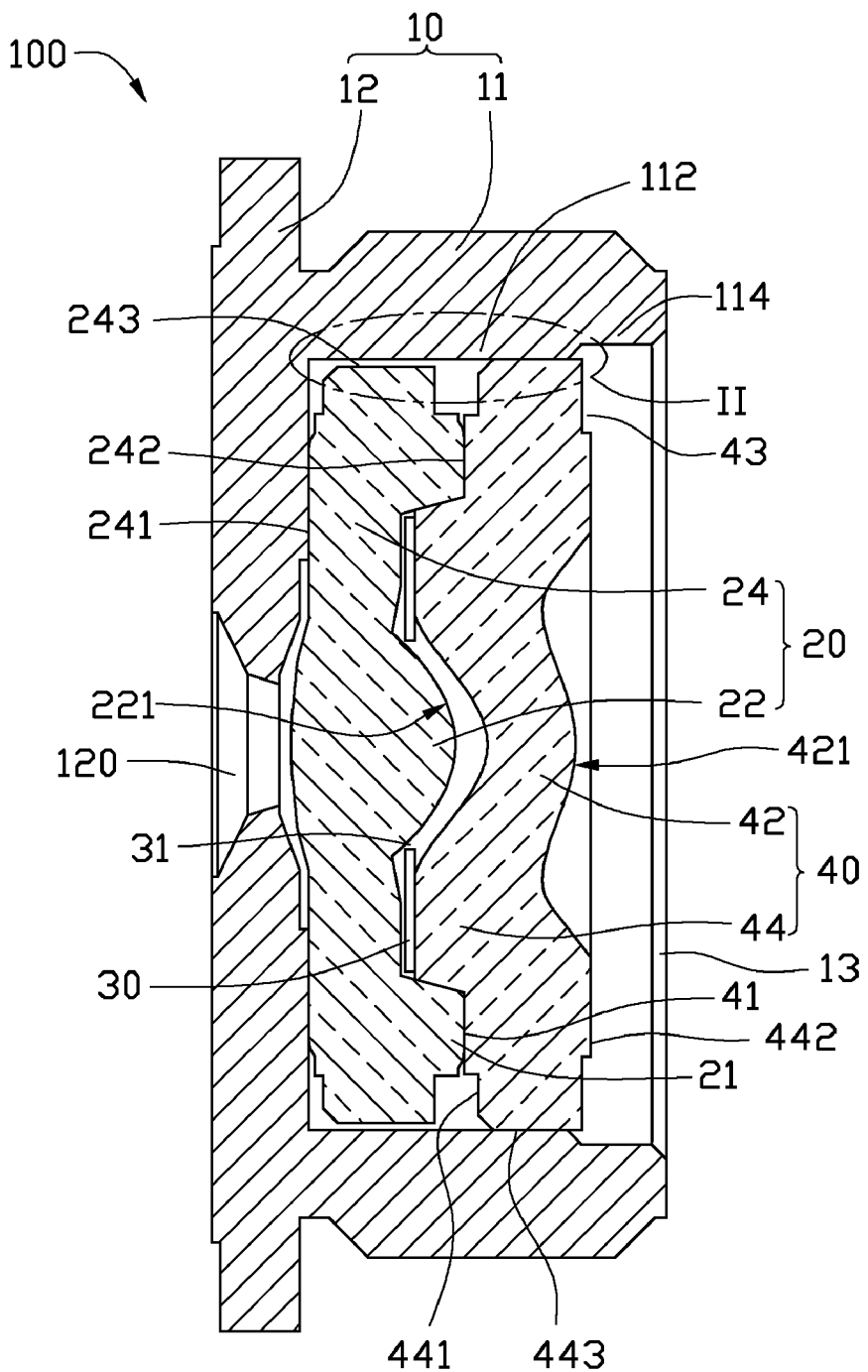
FIG. 1 is a schematic view of a camera module according to a first embodiment of the present disclosure.

Reference will now be made to the drawing figures to describe various embodiments of the present camera module in detail.

FIG. 1 shows a camera module 100 according to a first exemplary embodiment. The camera module 100 includes a lens barrel 10, a first lens 20, a spacer 30 and a second lens 40. The lens barrel 10 is a hollow cylindrical body. The first lens 20, the spacer 30 and the second lens 40 are received in the lens barrel 10.

Figure 2:
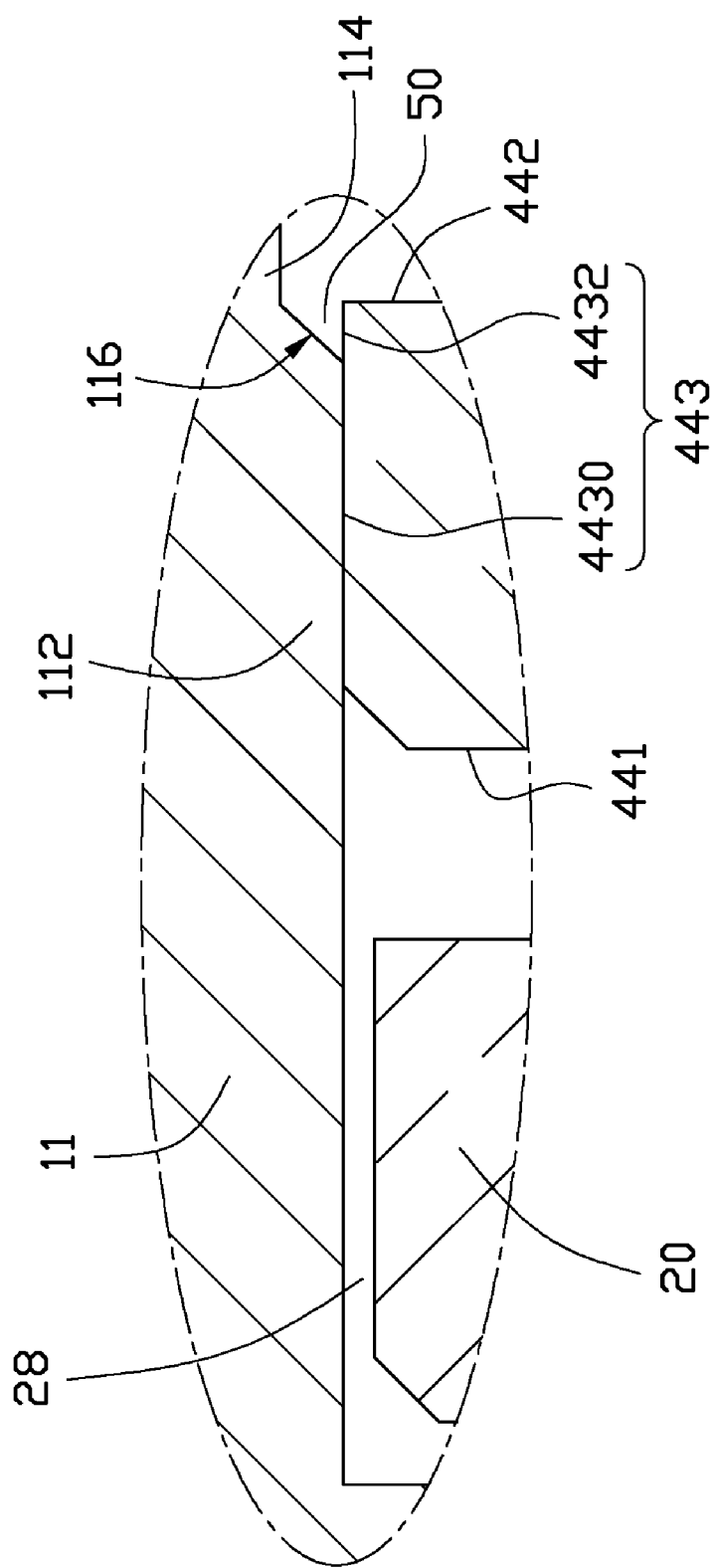
FIG. 2 is an enlarged view of a circled portion II of FIG. 1.

The lens barrel 10 includes a substantially cylindrical inner wall 11 and a flange 12 extending inwardly and perpendicular to an inner periphery of a front end of the inner wall 11. An opening 13 is defined at a rear end of the lens barrel 10. The flange 12 defines a light incident hole 120 which is concentric with the opening 13 at a central portion thereof for allowing light to entry into the lens barrel 10. A front portion 112 of the inner wall 11 adjacent to the flange 12 has an inner diameter less than that of a rear portion 114 of the inner wall 11 adjacent to the opening 13. Referring also to FIG. 2, an annular slanted step surface 116 is formed on an inner circumference surface of the inner wall 11 between the front portion 112 and the rear portion 114. The inner wall 11 of the lens barrel 10 has an inner diameter gradually increased along an axis thereof at the slanted step surface 116 from the front portion 112 to the rear portion 114.

The first lens 20 and the second lens 40 are comprised of glass or plastic material. The first lens 20 includes a circular first optical portion 22 located at a centre thereof and a first fixing portion 24 around the first optical portion 22. The first optical portion 22 includes a spherical first outer surface 221 focusing light passing therethrough. The first fixing portion 24 includes an annular first object-side surface 241 contacting the flange 12 of the lens module 10, an annular first image-side surface 242 facing the second lens 40, and a circumferential first side surface 243 interconnecting an outer periphery of the first object-side surface 241 with an outer periphery of the first image-side surface 242.

Similarly, the second lens 40 includes a circular second optical portion 42 located at a central portion thereof and a second fixing portion 44 around the optical portion 42. The second optical portion 42 includes a generally spherical second outer surface 421 focusing light passing therethrough. The second fixing portion 44 includes an annular second object-side surface 441, an annular second image-side surface 442, and a circumferential second side surface 443 interconnecting outer peripheries of the second object-side surface 441 and the second image-side surface 442. The second object-side surface 441 contacts the first image-side surface 242 of the first lens 20, and the second image-side surface 442 faces the opening 13 of the inner wall 11.

The first lens 20 has a diameter less than the inner diameter of the front portion 112 of the lens barrel 10. The first object-side surface 241 of the first lens 20 is planar. The second lens 40 has a diameter equal to or larger than the inner diameter of the front portion 112 of the inner wall 11, but less than the inner diameter of the inner wall 11 at the slanted step surface 116. In this embodiment, the diameter of the second lens 40 exceeds the inner diameter of the front portion 112 of the inner wall 11. Thus, the second lens 40 can be pre-secured in the front portion 112 of the lens barrel 10 with the second side surface 443 thereof interferentially contacting the inner surface of the front portion 112 of the lens barrel 10. An annular groove 43 is defined at a periphery portion of the second image-side surface 442 of the second lens 40.

A plurality of protruding members 21 extend perpendicular to the first image-side surface 242 of the first lens 20 towards the second object-side surface 441 of the second lens 40, and a plurality of receiving recesses 41 matching the protruding members 21 are respectively defined at the second object-side surface 441 of the second lens 40. The protruding members 21 and the receiving recesses 41 cooperatively form an engagement unit. When the first lens 20 and the second lens 40 are assembled in the lens barrel 10, the protruding members 21 of the first lens 20 are received in the receiving recesses 41 of the second lens 40, respectively, thereby ensuring an optical axis of the first lens 20 aligns with an optical axis of the second lens 40.

The spacer 30 is annular, and defines a circular aperture 31 at a center thereof. A diameter of the aperture 31 exceeds that of the first and second optical portions 22, 42 of the first and second lenses 20, 40. The spacer 30 is spaced a distance from the inner wall 11. The spacer 30 is dark polymer material to avoid multiple reflection, flare, and ghost images.

When assembled, the first lens 20 is placed into the lens barrel 10 via the opening 13. The first object-side surface 241 of the first lens 20 abuts the flange 12 of the lens barrel 10.

Since the diameter of the first lens 20 is less than the inner diameter of the front portion 112 of the lens barrel 10, axial spacing 28 around the first lens 20 is defined between the first side surface 243 of the first lens 20 and the inner surface of the front portion 112 of the lens barrel 10. The spacer 30 is disposed on the first image-side surface 242 and around the first optical portion 22 of the first lens 20. The second lens 40 is placed into the lens barrel 10 with the receiving recesses 41 thereof aligned with the protruding members 21 of the first lens 20, respectively. The second object-side surface 441 of the second lens 40 tightly contacts the first image-side surface 242 of the first lens 20. The second lens 40 is pre-secured in the lens barrel 10 with a front portion 4430 of the second side surface 443 abutting the inner surface of the front portion 112 of the lens barrel 10. A rear portion 4432 of the second side surface 443 of the second lens 40 faces the slanted step surface 116 of the lens barrel 10. An annular filling space 50 is thus defined between the rear portion 4432 of the second side surface 443 of the second lens 40 and the slanted step surface 116 of the lens barrel 10. The groove 43 of the second lens 40 communicates with the filling space 50.

UV-cure adhesive is disposed in the filling space 50. The UV-cure adhesive is exposed to ultraviolet radiation, and fills the filling space 50 uniformly. A portion of molten UV-cure adhesive penetrates into air clearances defined between the front portion 4430 of the second side surface 443 of the second lens 40 and the inner surface of the front portion 112 of the lens barrel 10. After the molten UV-cure adhesive is solidified, the second lens 20 and the lens barrel 10 are fixedly connected together by the second side surface 443 of the second lens 20 affixed to the inner surface of the inner wall 11 of the lens barrel 10. Therefore, the first lens 20 and the spacer 30 are assembled in the lens barrel 10 and sandwiched between the flange 12 and the second lens 40.

Due to the presence of the filling space 50, sufficient UV-cure adhesive can be disposed between the second lens 40 and the lens barrel 10 to enable a firm connection therebetween. Since the groove 43 defined in the second image-side surface 442 of the second lens 40 communicates with the filling space 50, excess molten UV-cure adhesive entering into the groove 43 from the filling space 50 after the UV-cure adhesive is melted. Commensurately, no excess molten UV-cure adhesive flows to other unwanted areas of the second image-side surface 442 of the second lens 40, avoiding the need for cleanup and simplifying assembly of the camera module 100. Moreover, since the second lens 40 is pre-secured in the lens barrel 10 before the UV-cure adhesive, the front portion 4430 of the second side surface 443 and inner surface of the front portion 112 of the lens barrel 10 can maintain contact with each other during later assembly steps of the camera module 100, to promote a crack free joint between the second lens 40 and the lens barrel 10. Due to the presence of the protruding members 21 and the receiving recesses 41, the first lens 20 can coaxially aligned with the second lens 40 to ensure a good concentricity of the first lens 20 and the second lens 40 after the first lens 20 and the second lens 40 are assembled in the lens barrel 10.

Figure 3:
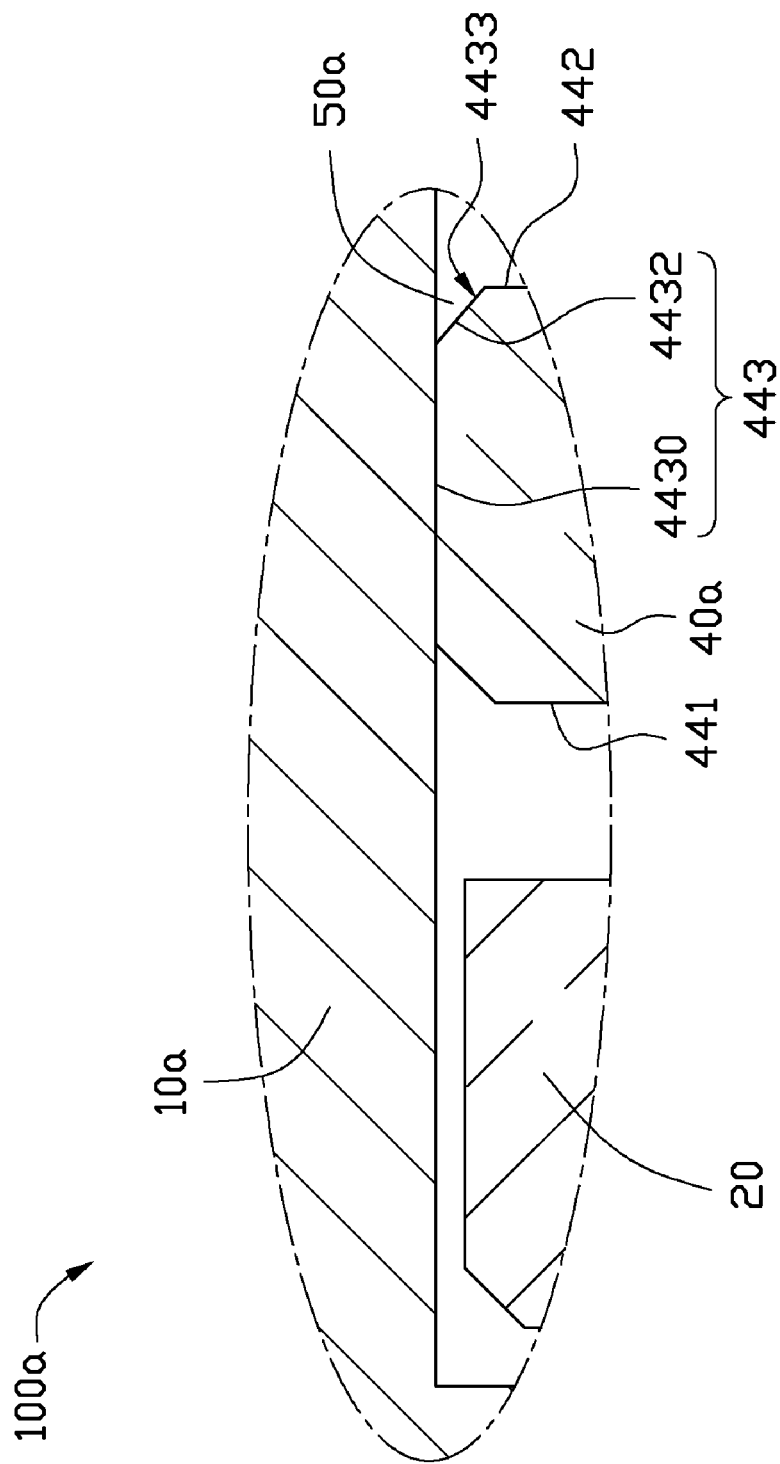
FIG. 3 is a partial view of a camera module according to a second embodiment of the present disclosure.

FIG. 3 shows a second embodiment of the camera module 110a, differing from the previous camera module 100 only in that an annular slanted step surface 4433 is formed at the rear portion 4432 of the second side surface 443 of the second lens 40a, and the lens barrel 10a has an inner diameter constant along the axis thereof. A diameter of the second lens 40 decreases gradually at the slanted step surface 4433 from one end that is adjacent to the second object-side surface 441 towards another end that is adjacent to the second image-side surface 442. When the second lens 40a is placed into the lens barrel 10a, the front portion 4430 of the side surface 443 of the second lens 40 interferentially contacting an inner surface of the lens barrel 10a, and a filling space 50a is defined between slanted step surface 4433 of the second lens 40 and the inner surface of the lens barrel 10a.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera module, comprising:
   a lens barrel comprising a substantially cylindrical inner wall and a flange extending inward from the inner wall at a first end of the inner wall;
   a first lens disposed in the lens barrel, and comprising a first optical portion and a first fixing portion surrounding the first optical portion, the first fixing portion comprising a first object-side surface contacting the flange, an opposite first image-side surface, and a first side surface between the first object-side surface and the first image-side surface;
   a second lens received in the lens barrel, and comprising a second optical portion and a second fixing portion surrounding the second optical portion, the second fixing portion comprising a second object-side surface engaging with the first image-side surface of the first lens, an opposite second image-side surface and a second side surface between the second object-side surface and the second image-side surface, the second side surface of the second lens comprising a first portion adjacent to the flange and a second portion away from the flange, the first portion tightly abutting the inner wall, the second portion spaced a distance from the inner wall to form a filling space therebetween, an annular groove being defined at a periphery portion of the second image-side surface of the second lens, the annular groove communicating with the filling space; and
   adhesive applied in the filling space between the second portion and the inner wall.

2. The camera module of claim 1, wherein a plurality of protruding members extend outward from one of the second object-side surface and the first image-side surface, and a plurality of receiving recesses are defined in the other one of the second object-side surface and the first image-side surface receiving the respective protruding members therein.

3. The camera module of claim 2, wherein the protruding members extend outwardly from the first image-side surface of the first lens towards the second lens, and the receiving recesses are defined in the second object-side surface of the second lens.

4. The camera module of claim 1, wherein the flange defines a light incident hole at a central portion thereof 5. The camera module of claim 1, wherein an annular slanted step surface is formed on the inner wall at a position spatially corresponding to the second portion of the second side surface, an inner diameter of the lens barrel at the slanted step surface gradually increasing in direction away from the flange.

6. The camera module of claim 5, wherein the lens barrel comprises a front portion where the flange is arranged and a rear portion with an inner diameter larger than that of the front portion, the slanted step surface being located between the front portion and the rear portion.

7. The camera module of claim 6, wherein a diameter of the second lens is equal to the inner diameter of the front portion of the inner wall.

8. The camera module of claim 1, wherein an annular slanted step surface is formed at the second portion of the second side surface of the second lens, a diameter of the slanted step surface decreasing gradually in a direction away from the first portion, the filling space being defined between the slanted step surface of the second lens and the inner wall.

9. The camera module of claim 8, wherein an inner diameter of the lens barrel is constant, and does not exceed the outer diameter of the first portion of the second side surface of the second lens.

10. The camera module of claim 1, further comprising a spacer disposed between the first lens and the second lens.

11. The camera module of claim 10, wherein the spacer is arranged on the first image-side surface and surrounds the first optical portion of the first lens.

12. A camera module, comprising:
a lens barrel comprising a substantially cylindrical inner wall;
a first lens received in the lens barrel, the first lens comprising a first circumferential side surface spaced from the inner wall;
a second lens engaged with the first lens and received in the lens barrel, the second lens comprising a second circumferential side surface, the second circumferential side surface having a first portion contacting the inner wall, and a second portion spaced from the inner wall, thus a gap defined between the second portion and the inner wall, an annular groove being defined at a periphery portion of an image-side surface of the second lens, the annular groove communicating with the gap; and
adhesive applied in the gap between the second portion and the inner wall.

13. The camera module of claim 12, further comprising an annular spacer sandwiched between the first lens and the second lens, the spacer spaced a distance from the inner wall.

14. The camera module of claim 12, wherein the inner wall of the lens barrel comprises a front portion, the first lens has a diameter less than the inner diameter of the front portion of the lens barrel.

* * * * *